US009882622B2

(12) United States Patent
Jeong et al.

(10) Patent No.: US 9,882,622 B2
(45) Date of Patent: Jan. 30, 2018

(54) APPARATUS AND METHOD FOR ADJUSTING RECEIVE BEAM GAIN IN A WIRELESS COMMUNICATION SYSTEM

(71) Applicant: Samsung Electronics Co., Ltd., Suwon-si, Gyeonggi-do (KR)

(72) Inventors: Cheol Jeong, Seongnam-si (KR); Hyun-Kyu Yu, Suwon-si (KR); Jeong-Ho Park, Seoul (KR); Kyung-Whoon Cheun, Seoul (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/822,146

(22) Filed: Aug. 10, 2015

(65) Prior Publication Data

US 2016/0043792 A1    Feb. 11, 2016

(30) Foreign Application Priority Data

Aug. 8, 2014    (KR) .................... 10-2014-0102093

(51) Int. Cl.
*H04W 4/00*    (2009.01)
*H04B 7/06*    (2006.01)
(Continued)

(52) U.S. Cl.
CPC .......... *H04B 7/0617* (2013.01); *H01Q 1/243* (2013.01); *H01Q 3/34* (2013.01); *H01Q 3/36* (2013.01); *H04B 7/0857* (2013.01); *H01Q 21/08* (2013.01)

(58) Field of Classification Search
CPC ..... H04W 24/00; H04W 84/12; H04W 88/08; H04W 80/04; H04W 88/06; H04W 84/18;
(Continued)

(56) References Cited

U.S. PATENT DOCUMENTS 7,260,539 B2 *    8/2007    Cosatto ............ G06F 17/30905
                                                    345/473
8,290,539 B2 *    10/2012    Li ........................ H04L 1/0017
                                                    375/260
(Continued)

FOREIGN PATENT DOCUMENTS

KR    10-2013-0030404 A    3/2013

*Primary Examiner* — Brenda H Pham
(74) *Attorney, Agent, or Firm* — Jefferson IP Law, LLP

(57) ABSTRACT

The present disclosure is related to a $5^{th}$ generation (5G) or pre-5G communication system to provide higher data rates than a $4^{th}$ generation (4G) communication system such as long term evolution (LTE). A method for adjusting a receive beam gain by a user equipment (UE) in a wireless communication system is provided. The method includes estimating a received signal quality value based on a reference signal received from a base station (BS), transmitting information about the estimated received signal quality value to the BS, comparing the received signal quality value with a minimum received signal quality value required for successful reception of data from the BS, and adjusting a receive beam gain to be used for data reception by turning on/off a radio frequency (RF) chain formed for each of antennas included in the UE based on a result of the comparison.

16 Claims, 11 Drawing Sheets

(51) Int. Cl.
  *H01Q 3/34* (2006.01)
  *H04B 7/08* (2006.01)
  *H01Q 1/24* (2006.01)
  *H01Q 3/36* (2006.01)
  *H01Q 21/08* (2006.01)

(58) Field of Classification Search
  CPC ..... H04L 43/50; H04L 43/0852; H04L 43/08; H04L 2012/5608; H04B 17/003
  USPC .... 370/252, 310.2, 328, 319, 334, 332, 333, 370/344, 349
  See application file for complete search history.

(56) References Cited

U.S. PATENT DOCUMENTS

| | | | | |
|---|---|---|---|---|
| 8,634,874 B2 * | 1/2014 | Molnar | ............... | H01Q 1/246 455/562.1 |
| 2006/0135097 A1 * | 6/2006 | Wang | ............... | H04B 7/0857 455/132 |
| 2006/0245512 A1 * | 11/2006 | Rha | ............... | H04B 7/0617 375/267 |
| 2007/0099578 A1 * | 5/2007 | Adeney | ............... | H04B 7/0408 455/69 |
| 2010/0015927 A1 * | 1/2010 | Yuda | ............... | H04B 7/0617 455/69 |
| 2010/0322223 A1 * | 12/2010 | Choi | ............... | H04B 7/0452 370/342 |
| 2012/0276896 A1 * | 11/2012 | Ren | ............... | H04L 1/0003 455/423 |
| 2013/0057432 A1 | 3/2013 | Rajagopal et al. | | |
| 2013/0072247 A1 | 3/2013 | Park et al. | | |
| 2013/0229307 A1 | 9/2013 | Chang et al. | | |
| 2014/0113676 A1 | 4/2014 | Hamalainen et al. | | |
| 2014/0146863 A1 * | 5/2014 | Seol | ............... | H04B 7/0456 375/224 |

* cited by examiner

APPARATUS AND METHOD FOR ADJUSTING RECEIVE BEAM GAIN IN A WIRELESS COMMUNICATION SYSTEM

CROSS-REFERENCE TO RELATED APPLICATION(S)

This application claims the benefit under 35 U.S.C. § 119(a) of a Korean patent application filed on Aug. 8, 2014 in the Korean Intellectual Property Office and assigned Serial number 10-2014-0102093, the entire disclosure of which is hereby incorporated by reference.

TECHNICAL FIELD

The present disclosure relates to an apparatus and method for adjusting a receive beam gain in a wireless communication system.

BACKGROUND

In order to satisfy demands for wireless data traffic which have been increased since commercialization of a $4^{th}$ generation (4G) communication system, efforts are being made to develop an advanced $5^{th}$ generation (5G) or pre-5G communication system. Thus, the 5G or pre-5G communication system is called a beyond 4G or post long term evolution (post LTE) system.

To achieve high data rates, implementation of the 5G communication system is being considered in a millimeter wave (mmW) band (for example, a 60-GHz band). Techniques such as beamforming, massive multiple input multiple output (massive MIMO), full dimensional MIMO (FD-MIMO), array antenna, analog beamforming, and large-scale antenna are under consideration for the 5G communication system to mitigate path loss of waves and increase a propagation distance of waves in the millimeter wave band.

Further, for network improvement, techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation are being developed for the 5G communication system.

In addition, hybrid frequency-shift keying (FSK), wide amplitude modulation (WAM), frequency and quadrature amplitude modulation (FQAM), and sliding window superposition coding (SWSC), which are advanced coding modulations (ACMs); and filter bank multi-carrier (FBMC), non-orthogonal multiple access (NOMA), and sparse code multiple access (SCMA), which are advanced access techniques, are under development for the 5G system.

A cellular communication system typically uses a frequency band of 10 GHz or below. It is very difficult to secure a wide frequency band in the cellular communication system. Therefore, there is a need for securing a wideband frequency in a higher frequency band. However, as the frequency for wireless communication increases, propagation path loss increases. As a result, a propagation distance decreases and service coverage is also reduced. To solve the problem, beamforming has recently been introduced as a technique to mitigate propagation path loss and increase a propagation distance.

A beamforming-based wireless communication system may use a high-frequency area in transmitting a signal and thus a plurality of antennas may be integrated in an evolved Node B (eNB) and a user equipment (UE). The eNB and the UE perform beam sweeping using a large number of antennas. In other words, the eNB transmits a signal once or more times in all possible transmission beam directions and the UE receives the signal from all possible reception beam directions. To increase a receive gain, the UE may receive the signal using all of its reception antennas. However, although the receive beamforming gain is maximized, the power of the UE is wasted. Accordingly, there is a need for a method for overcoming the problem.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for adjusting a receive beamforming gain in a wireless communication system.

Another aspect of the present disclosure is to provide a method and apparatus for adjusting a receive beamforming gain, taking into account a received signal quality at a user equipment (UE) in a wireless communication system.

In accordance with an aspect of the present disclosure, a method for adjusting a receive beam gain by a UE in a wireless communication system is provided. The method includes estimating a received signal quality value based on a reference signal received from a base station (BS), transmitting information about the estimated received signal quality value to the BS, comparing the received signal quality value with a minimum received signal quality value required for successful reception of data from the BS, and adjusting a receive beam gain to be used for data reception by turning on/off a radio frequency (RF) chain formed for each of antennas included in the UE based on a result of the comparison.

In accordance with another aspect of the present disclosure, a method for adjusting a receive beam gain by a BS in a wireless communication system is provided. The method includes transmitting a reference signal to a UE, receiving a channel quality indicator (CQI) for the reference signal from the UE, calculating a modulation and coding scheme (MCS) level based on the CQI, to be applied to data transmission and an MCS offset being a difference between a reference signal transmission power and a data transmission power, and transmitting control information including the MCS level and the MCS offset to the UE.

In accordance with another aspect of the present disclosure, a UE for adjusting a receive beam gain in a wireless communication system is provided. The UE includes a controller configured to estimate a received signal quality value based on a reference signal received from a BS, compare the received signal quality value with a minimum received signal quality value required for successful reception of data from the BS, and adjust a receive beam gain to be used for data reception by turning on/off an RF chain formed for each of antennas included in the UE based on a comparison result, and a transceiver configured to transmit information about the estimated received signal quality value to the BS.

In accordance with another aspect of the present disclosure, a BS for adjusting a receive beam gain in a wireless communication system is provided. The BS includes a transceiver configured to transmit a reference signal to a UE, receive a CQI for the reference signal from the UE, and transmit control information including the MCS level and the MCS offset to the UE, and a controller configured to calculate an MCS level based on the CQI, to be applied to data transmission and an MCS offset being a difference between a reference signal transmission power and a data transmission power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
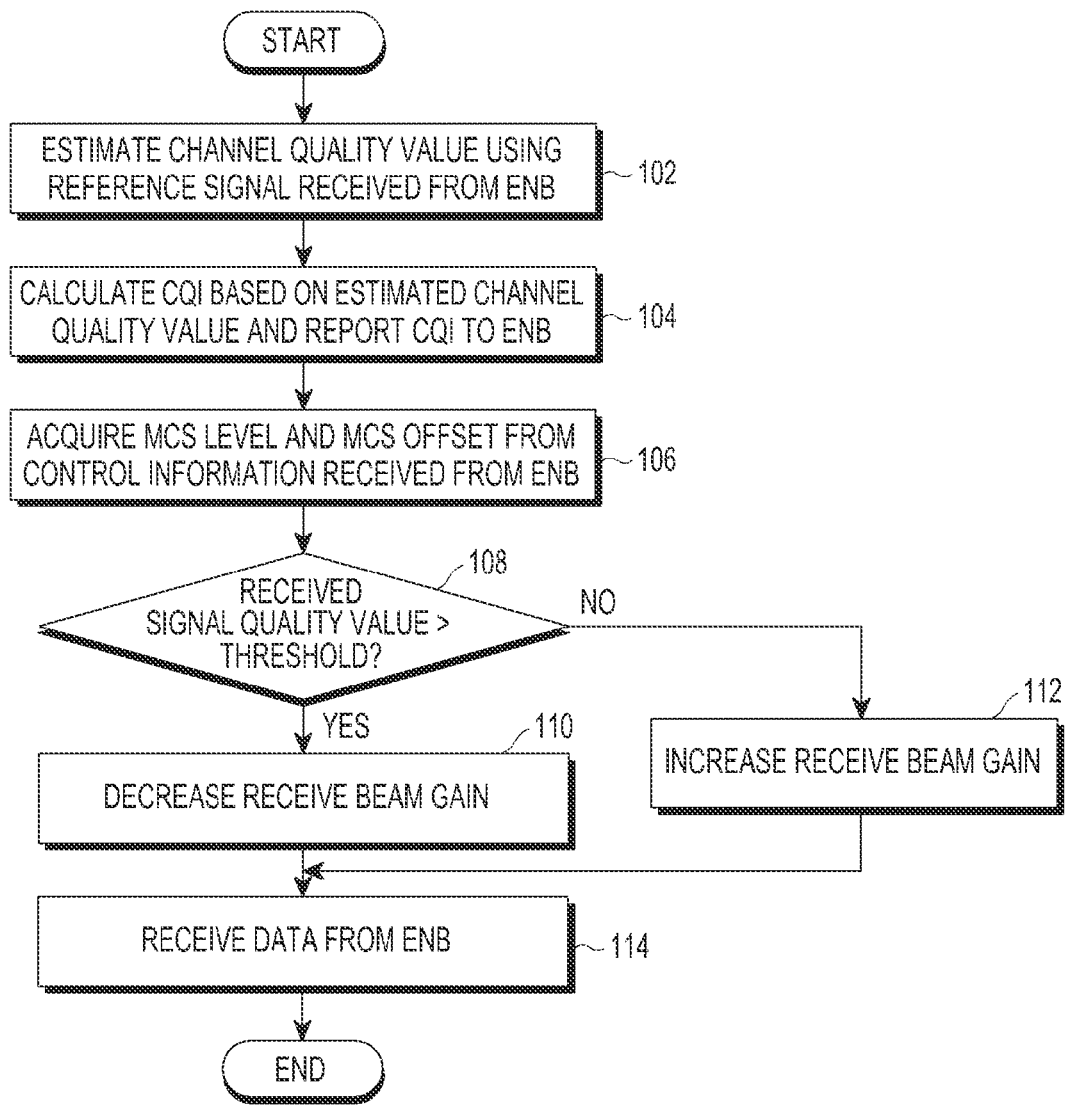
FIG. 1 is a flowchart illustrating an operation of a user equipment (UE) for adjusting a receive beam gain in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may be a device with communication functionalities. For example, the electronic device may be at least one of a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (for example, a head-mounted device (HMD), electronic clothes, an electronic bracelet, an electronic necklace, an electronic appcessory, an electronic tattoo, or a smart watch).

According to various embodiments of the present disclosure, an electronic device may be a smart home appliance with communication functionalities. For example, the smart home appliance may be at least one of a television (TV), a digital versatile disc (DVD) player, audio player, a refrigerator, an air conditioner, a vacuum cleaner, an oven, a micro oven, a washer, a dryer, an air purifier, a set-top box, a TV box (for example, Samsung HomeSync™, Apple TV™, Google TV™, or the like), a game console, an electronic dictionary, a camcorder, an electronic picture frame, and the like.

According to various embodiments of the present disclosure, an electronic device may be at least one of a medical device (for example, a magnetic resonance angiography (MRA) device, a magnetic resonance imaging (MRI) device, a computed tomography (CT) device, an imaging device, an ultrasonic device, or the like), a navigation device, a global positioning system (GPS) receiver, an event data recorder (EDR), a flight data recorder (FDR), an automotive infotainment device, a naval electronic device (for example, a naval navigation device, a gyroscope, a compass, or the like), an avionic electronic device, a security device, an industrial or consumer robot, and the like.

According to various embodiments of the present disclosure, an electronic device may be at least one of furniture, part of a building/structure, an electronic board, an electronic signature receiving device, a projector, and various measuring devices (for example, water, electricity, gas or electro-magnetic wave measuring devices), that include communication functionalities.

According to various embodiments of the present disclosure, an electronic device may be one or a combination of two or more of the foregoing devices. In addition, it will be apparent to one having ordinary skill in the art that an electronic device according to the present disclosure is not limited to the foregoing devices.

It is to be understood that a method and apparatus according to an embodiment of the present disclosure are applicable to an Institute of Electrical and Electronics Engineers (IEEE) 802.11 communication system, an IEEE 802.16 communication system, a digital video broadcasting system for providing a mobile broadcasting service such as digital multimedia broadcasting (DMB), digital video broadcasting-handheld (DVP-H), and advanced television systems committee-mobile/handheld (ATSC-M/H), and an Internet protocol (IP) TV service, and various communication systems including an MPEG media transport (MMT) system, an evolved packet system (EPS), a long term evolution (LTE) communication system, an LTE-advanced (LTE-A) communication system, a high speed downlink packet access (HSDPA) mobile communication system, a high speed uplink packet access (HSUPA) mobile communication system, a $3^{rd}$ Generation Project Partnership 2 (3GPP2) high rate packet data (HRPD) mobile communication system, a 3GPP2 wideband code division multiple access (WCDMA) mobile communication system, a 3GPP2 CDMA mobile communication system, and a Mobile IP system.

To allow a user equipment (UE) to successfully detect or decode a signal transmitted by an evolved Node B (eNB), the received signal quality value of the UE should be equal to or larger than a threshold. Successful detection or decoding of a signal at the UE means that the detection failure probability or decoding error probability of the signal is equal to or less than a threshold, and the threshold is a minimum received signal quality value required for successfully detect or decode the signal. The UE may have prior knowledge of a threshold for each signal transmitted by the eNB, receive the threshold from the eNB, or calculate the threshold autonomously.

For example, if the eNB transmits a synchronization signal, the type of a synchronization sequence is predefined as Zadoff-Chu sequence, M sequence, or the like. Therefore, if the eNB transmits the synchronization signal with predetermined transmission power, a threshold for the synchronization signal is constant during a specific time period over which the transmission power of the eNB is kept unchanged.

In another example, if the eNB transmits a signal on a broadcast channel, a channel coding scheme, a code rate, and a multi-antenna transmission scheme are predefined according to the number of antennas in the eNB. Accordingly, if the eNB transmits the synchronization signal with predetermined transmission power, a threshold for the synchronization signal is constant during a specific time period over which the transmission power of the eNB is kept unchanged.

In regard to a signal for which a threshold is constant among signals transmitted by the eNB, if a received signal quality value of the signal measured by the UE is larger than the threshold, the UE decreases a receive beam gain of the UE. If the received signal quality value of the signal measured by the UE is less than the threshold, the UE increases the receive beam gain. Decreasing a receive beam gain amounts to decreasing a receive beam gain with which the UE will receive a signal from the eNB to below a receive beam gain used in measuring a received signal quality value. Increasing a receive beam gain amounts to increasing a receive beam gain with which the UE will receive a signal from the eNB to above a receive beam gain used in measuring a received signal quality value.

The eNB transmits a reference signal, a synchronization signal, or a data channel signal to the UE and the UE measures a received signal quality value using the received signal. The received signal quality value includes at least one of a path loss value, a signal-to-noise ratio (SNR), a signal-to-interference plus noise ratio (SINR), a signal-to-leakage plus noise ratio (SLNR), a value indicated by a reference signal strength indicator (RSSI), a reference signal received quality (RSRQ) value, and a reference signal received power (RSRP) value. The received signal quality value may be an instantaneous value calculated at a specific time point or a weight sum value of values calculated at a plurality of time points within a specific window.

FIG. 1 is a flowchart illustrating an operation for adjusting a receive beam gain at a UE in a wireless communication system according to an embodiment of the present disclosure.

Referring to FIG. 1, the UE estimates a channel quality value using a signal received from an eNB, for example, a reference signal in operation 102. In operation 104, the UE calculates a channel quality indicator (CQI) based on the estimated channel quality value and reports the CQI to the eNB in operation 104. The UE periodically reports a CQI to the eNB.

In operation 106, the UE receives control information on a physical downlink control channel (PDCCH) or an enhanced PDCCH (EPDCCH) from the eNB and acquires a modulation and coding scheme (MCS) level and an MCS offset from the control information. The MCS offset is calculated by subtracting a transmission power with which the eNB will transmit data (i.e., a data transmission power) from a transmission power with which the eNB has transmitted a reference signal (i.e., a reference transmission power). The MCS offset is one of a positive value, a negative value, and 0. If the MCS offset is a positive value, this implies that the eNB decreases the data transmission power to below the reference transmission power. If the MCS offset is a negative value, this implies that the eNB increases the data transmission power to above the reference transmission power.

In operation 108, the UE compares a received signal quality value with a predetermined threshold. The received signal quality value has been estimated in operation 102. The predetermined threshold is a minimum received signal quality value required for successful data reception. For example, the UE may determine the threshold based on the MCS level. The UE may determine the threshold to be a real value corresponding to a predetermined MCS level. The predetermined MCS level may range, for example, from level 0 to level 15. A unit for representing the real value corresponding to the MCS level is identical to a unit for representing a beam gain. In another example, the received signal quality value may be a channel quality value estimated using another reference signal received from the eNB between operation 102 and operation 108.

In another example, the eNB may determine the threshold based on a CQI index so that a data reception error rate may not be too large during adjustment of a receive beam gain. The UE may determine the threshold to be a real value corresponding to a predetermined CQI index. The real value corresponding to the CQI index may be calculated based on an instantaneous received signal quality value calculated at a specific time point or a received signal quality value calculated by weight-summing values calculated at a plurality of time points within a specific window. A unit for representing the real value corresponding to the CQI index is identical to a unit for representing a beam gain.

In another example, the UE may determine the threshold based on the MCS level and the MCS offset that have been acquired in operation 106. The UE may determine the threshold to be the sum of the real value corresponding to the MCS level and the MCS offset.

If the received signal quality value is larger than the threshold in operation 108, the UE decreases a receive beam gain to be used for receiving data from the eNB in operation 110. The UE sets the receive beam gain to be used for the data reception to be lower than a receive beam gain used for reception of a reference signal. On the other hand, if the received signal quality value is less than the threshold in operation 108, the UE increases the receive beam in operation 112. The UE sets the receive beam gain to be used for the data reception to be higher than the receive beam gain used for reception of the reference signal. Herein, the UE may decrease the receive beam gain by (received signal quality value)−(threshold) or increase the receive beam gain by (threshold)−(received signal quality value). While not shown, if the received signal quality value is equal to the threshold in operation 108, the UE does not adjust the receive beam gain.

In operation 114, the UE receives data on a physical downlink shared channel (PDSCH) from the eNB.

While a receive beam gain is shown in FIG. 1 as adjusted depending on whether a received signal quality is larger or less than a threshold, by way of example, the UE may decrease the receive beam gain if the received signal quality value is larger than (threshold+α) and may increase the receive beam gain if the received signal quality value is less than (threshold−β) in another example. In this case, if the received signal quality value is equal to or larger than (threshold−β) and equal to or less than (threshold+α), the UE does not adjust the receive beam gain. Herein, α and β are positive numbers having the same unit as the threshold.

In FIG. 1, minimum and maximum adjustment values are defined for adjusting a receive beam gain at the UE. If a decrement of the receive beam gain is less than the minimum value, the receive beam gain is decreased by the minimum value and if an increment of the receive beam gain is larger than the maximum value, the receive beam gain is increased by the maximum value.

Figure 2:
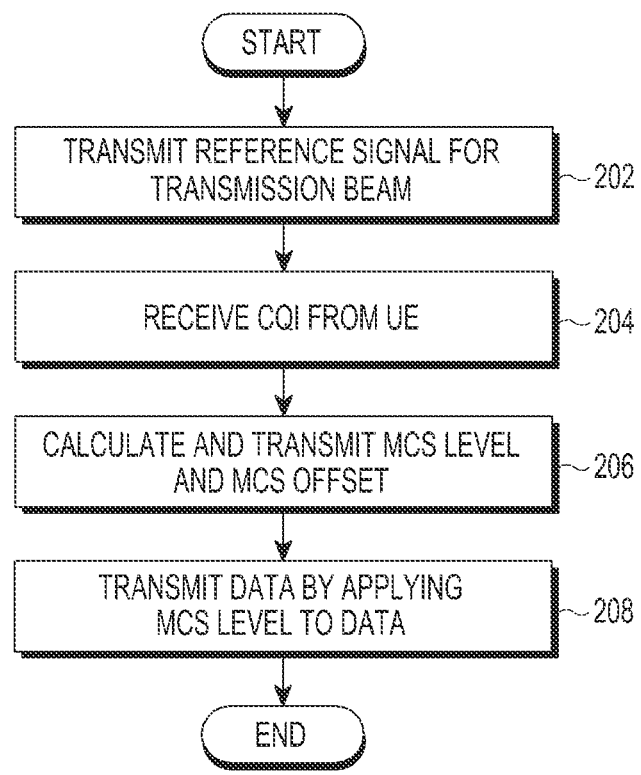
FIG. 2 is a flowchart illustrating an operation of an evolved Node B (eNB) for adjusting a receive beam gain of a UE in a wireless communication system according to an embodiment of the present disclosure.

FIG. 2 is a flowchart illustrating an operation of an eNB for adjusting a receive beam gain of a UE in a wireless communication system according to an embodiment of the present disclosure.

Referring to FIG. 2, the eNB transmits a reference signal for each transmission beam to the UE in operation 202. In operation 204, the eNB receives a CQI calculated using the reference signal from the UE. The UE reports a CQI to the eNB periodically.

In operation 206, the eNB calculates an MCS level for use in data transmission, based on the CQI reported by the UE and calculates an MCS offset, taking into account the CQI and a transmission scheme and transmission power to be used for data transmission. The eNB calculates the MCS offset by subtracting a data transmission power to be used for data transmission from a reference transmission power used for transmission of the reference signal. The MCS offset is one of a positive value, a negative value, and 0. If the MCS offset is a positive value, this implies that the eNB decreases the data transmission power to below the reference transmission power. If the MCS offset is a negative value, this implies that the eNB increases the data transmission power to above the reference transmission power. Also, the eNB transmits control information including the calculated MCS level and MCS offset to the UE on a PDCCH or an EPDCCH in operation 206.

In operation 208, the eNB transmits data using the MCS level calculated in operation 206. Herein, the data is transmitted on a PDSCH.

Figure 3:
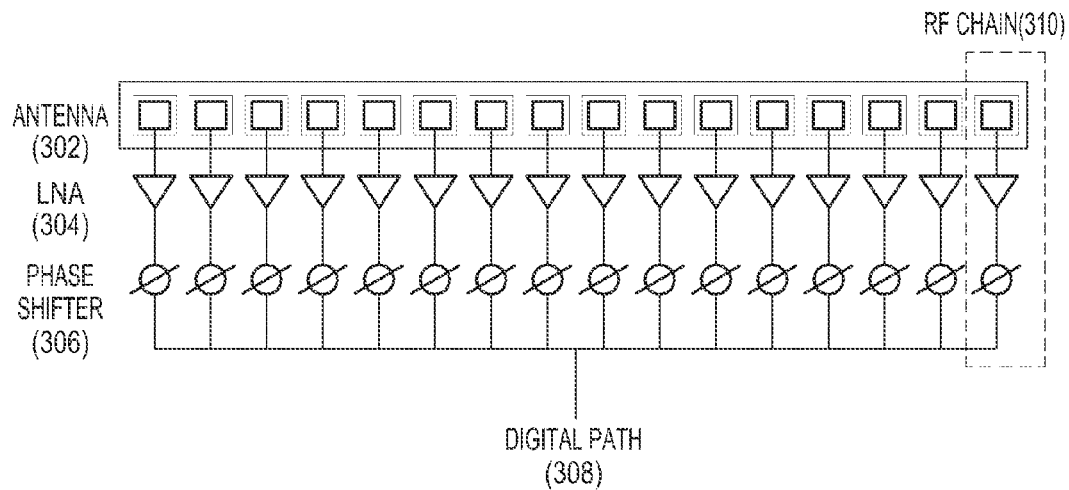
FIG. 3 is a view illustrating radio frequency (RF) chains in a reception front-end structure in a wireless communication system according to an embodiment of the present disclosure.

FIG. 3 illustrates radio frequency (RF) chains in a reception front-end structure in a wireless communication system according to an embodiment of the present disclosure.

Referring to FIG. 3, the illustrated reception front-end structure includes a plurality of antennas 302, a plurality of low noise amplifiers (LNAs) 304, and a plurality of phase shifters 306. The phase shifters 306 are connected to a digital path 308. It is assumed that the plurality of antennas 302 are arranged in a uniform linear array. Each of the antennas 302 is connected to a specific LNA and a specific phase shifter, thus forming one RF chain 310. As many RF chains as the number of antennas 302 are formed.

As described above, the UE has as many RF chains as the number of antennas and may adjust a receive beam gain by turning on/off the RF chains. In another example of FIG. 3, a plurality of antennas may be arranged in a two-dimensional square or a circle or a three-dimensional hexahedron or sphere.

In FIG. 3, the receive beam gain may be changed in various manners according to an antenna configuration and an on/off scheme for the RF chains and the various manners may be determined in theory, by simulation, or by experiment, which does not change the subject matter of the present disclosure.

Figure 4A:
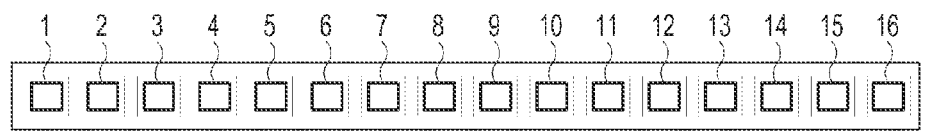
FIGS. 4A, 4B, and 4C illustrate examples in which a UE turns on/off RF chains to adjust a receive beam gain in a wireless communication system according to various embodiments of the present disclosure.
Figure 4B:
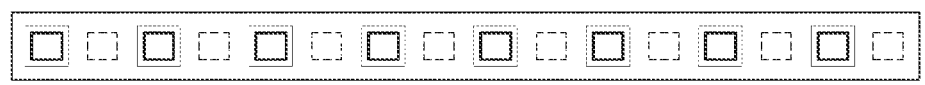
Figure 4C:
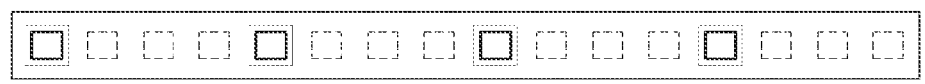

FIGS. 4A, 4B, and 4C illustrate examples in which a UE turns on/off RF chains to adjust a receive beam gain in a wireless communication system according to various embodiments of the present disclosure.

Referring to FIGS. 4A to 4C, each of squares 1 to 16 represents an RF chain and each RF chain includes an antenna, an LNA, and a phase shifter, as described with reference to FIG. 3. In FIGS. 4A to 4C, it is assumed that the UE has 16 antennas. Thus, 16 RF chains are shown. FIG. 4A illustrates a state in which the 16 RF chains are all turned on, FIG. 4B illustrates a state in which 8 RF chains are all turned on, and FIG. 4C illustrates a state in which 4 RF chains are all turned on.

In FIGS. 4A to 4C, it is assumed that the 16 RF chains are in the state illustrated in FIGS. 4A to 4C. State B illustrated in FIG. 4B has a less receive beam gain than State A illustrated in FIG. 4A, and State C illustrated in FIG. 4C has a less receive beam gain than State B illustrated in FIG. 4B. In other words, as the number of RF chains increases, the receive beam gain increases, and as the number of RF chains in the on state decreases, the receive beam gain decreases.

For example, if the RF chains of the UE are in State A, the UE may decrease the receive beam gain by turning off at least one of the current on-state RF chains. The UE may turn off 6 RF chains as in State B or 12 RF chains as in State C. In this manner, the UE adjusts the receive beam gain by selecting one of the receive beam gain of the RF chains in State B and the receive beam gain of the RF chains in State C, which is close to an intended receive beam gain.

In another example, if the RF chains of the UE are in State C, the UE may decrease the receive beam gain by turning on at least one of the current on-state RF chains. The UE may turn on 4 RF chains as in State B or 12 RF chains as in State A. In this manner, the UE adjusts the receive beam gain by selecting one of the receive beam gain of the RF chains in State A and the receive beam gain of the RF chains in State B, which is close to an intended receive beam gain.

As described above, the UE may adjust the receive beam gain by turning on/off RF chains. A reception beam direction after adjustment of the receive beam gain should be as identical as possible to a reception beam direction before adjustment of the receive beam gain. For this purpose, the UE should appropriately adjust a phase shift of a phase shifter included in a turned-on RF chain.

In another example, 8 successive RF chains may be in the on state, while the remaining 8 RF chains may be in the off state in State B. In State C, 4 successive RF chains may be in the on state, and the remaining 12 RF chains may be in the off state.

Figure 5:
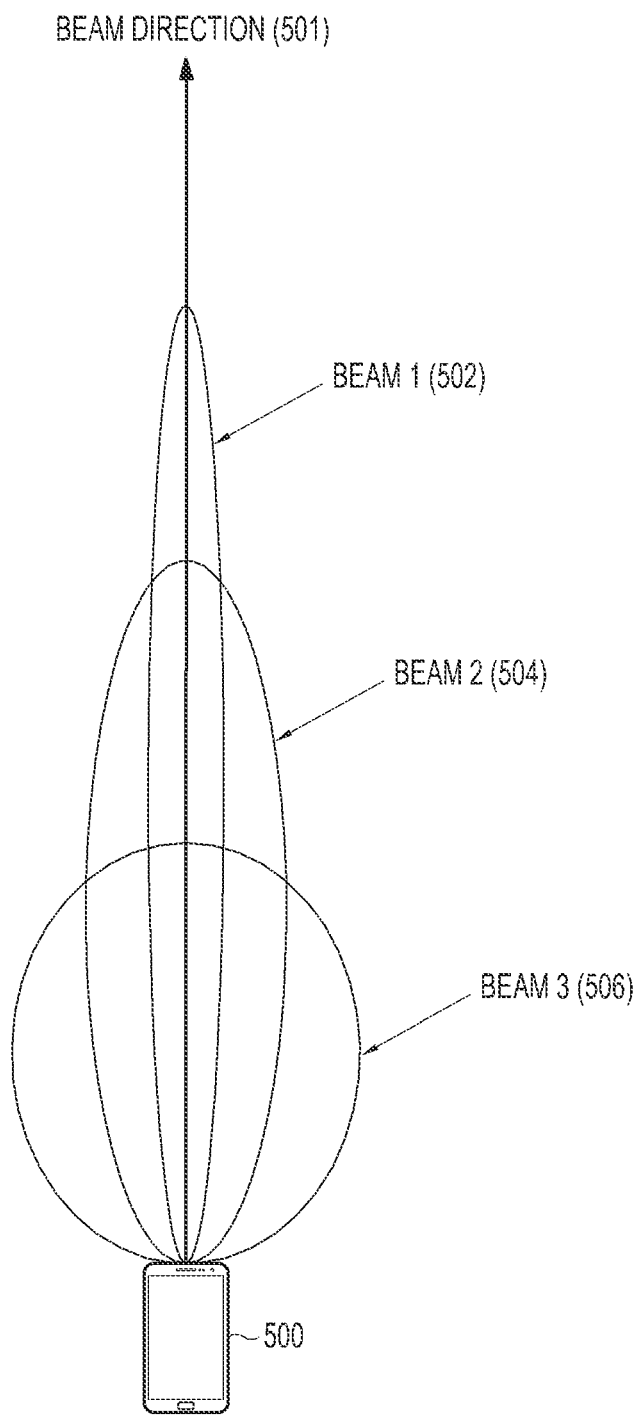
FIG. 5 illustrates an example in which a UE adjusts a beam direction using a phase shifter, when the UE adjusts a receive beam gain in a wireless communication system according to an embodiment of the present disclosure.

FIG. 5 illustrates an example in which a UE adjusts a beam direction using a phase shifter, when the UE adjusts a receive beam gain in a wireless communication system according to an embodiment of the present disclosure.

Referring to FIG. 5, it is assumed that a UE 500 forms beam 1 502, beam 2 504, and beam 3 506 in a beam direction 501 and the receive beam gains of beam 1, beam 2, and beam 3 are higher in the order of beam 1, beam 2, and beam 3. The receive beam gain of beam 1 502 is the largest and the receive beam gain of beam 3 506 is the smallest.

For example, if the UE 500 using beam 1 502 wants to decrease the receive beam gain to that of beam 2 504, the UE 500 may reduce the receive beam gain by turning off at least one of the current on-state RF chains. The UE matches a reception beam direction before adjustment of a beam gain to a reception beam direction after adjustment of a beam gain by appropriately adjusting each of the on-state RF chains after adjustment of the receive beam gain. The UE appropriately adjusts the phase shifters so that the direction of beam 1 502 being a reception beam before adjustment of a beam gain matches as much as possible to the direction of beam 2 504 being a reception beam after adjustment of a beam gain.

In another, if the UE 500 using beam 3 506 wants to increase the receive beam gain to that of beam 2 504, the UE 500 may increase the receive beam gain by turning on at least one of the current off-state RF chains. The UE matches a reception beam direction before adjustment of a beam gain to a reception beam direction after adjustment of a beam gain by appropriately adjusting each of the off-state RF chains after adjustment of the receive beam gain. The UE appropriately adjusts the phase shifters so that the direction of beam 3 506 being a reception beam before adjustment of a beam gain matches as much as possible to the direction of beam 2 504 being a reception beam after adjustment of a beam gain.

The operation of a UE for adjusting a receive beam gain by turning on/off RF chains has been described by way of example, with reference to FIGS. 4A to 5. On the other hand, the UE may adjust a receive beam gain by changing a reception beam to another predetermined beam in another method. In this case, a plurality of beams based on different receive beam gains and different reception beam directions are predefined in the form of (receive beam gain to reception beam direction). On-state RF chains and phase shift values of the phase shifters of the on-state RF chains are preliminarily calculated for each of the plurality of beams stored in the form of (receive beam gain to reception beam direction) and stored in a storage device.

Subsequently, when the UE adjusts a receive beam gain, the UE searches for a beam of (receive beam gain to reception beam direction) to adjust the receive beam gain to an intended receive beam gain without changing a receive beam direction as much as possible, reads on-state RF chains and phase shift values for the phase shifters of the on-state RF chains from the storage device according to the beam of the detected (receive beam gain to reception beam direction), and adjusts the receive beam gain according to the on-state RF chains and the phase shift values.

Figure 6:
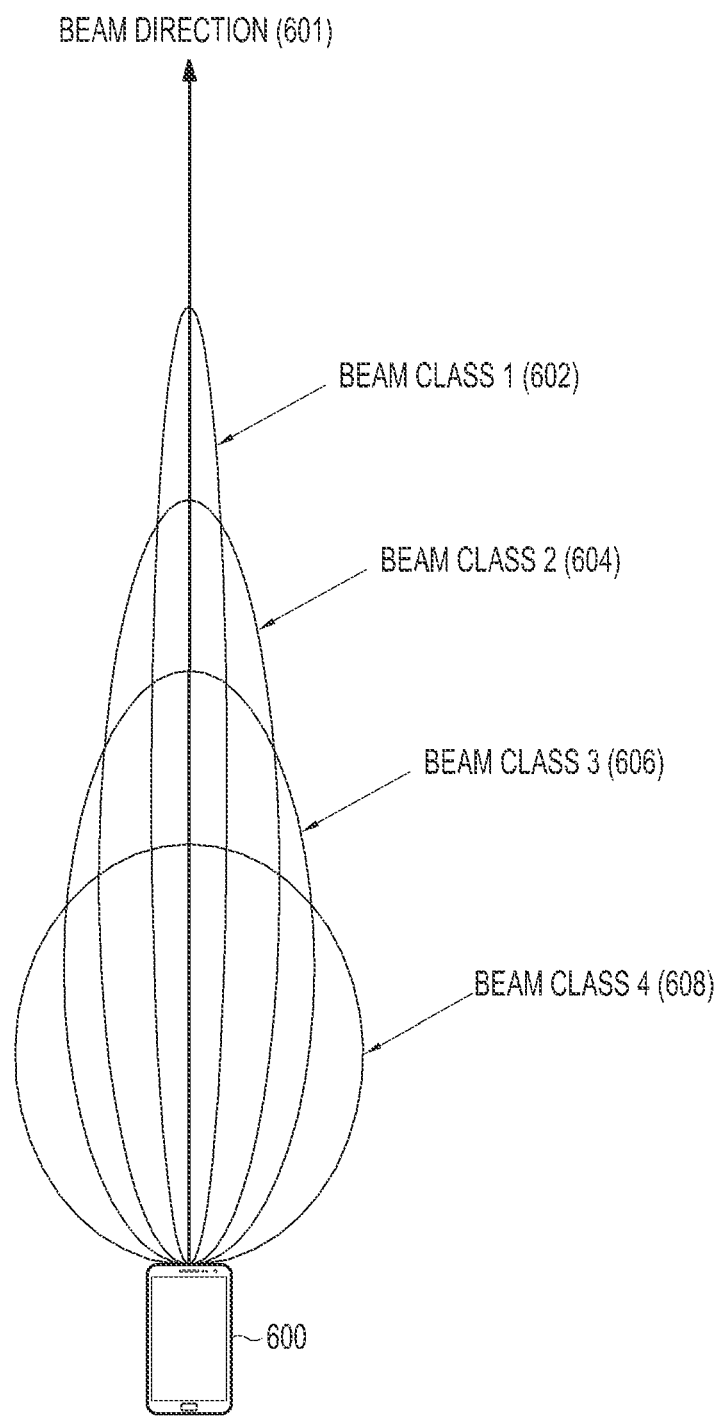
FIG. 6 illustrates an example in which a UE adjusts a receive beam gain by changing a beam class in a wireless communication system according to an embodiment of the present disclosure.

FIG. 6 illustrates an example in which a UE adjusts a receive beam gain by changing a beam class in a wireless communication system according to an embodiment of the present disclosure.

Referring to FIG. 6, the UE uses beam class 1 602, beam class 2 604, beam class 3 606, and beam class 4 608, which are formed in a specific beam direction 601. It is assumed that the receive beam gain decreases in the order of beam class 1, beam class 2, beam class 3, and beam class 4. Beam class 1 602 has the largest receive beam gain and beam class 4 608 has the least receive beam gain.

A beam class is predetermined for each UE. A UE 600 has prior knowledge of the UE's beam class and may change the beam class according to a channel quality value. The UE may measure a channel quality value, for example, a path loss value, using a reference signal received from an eNB and change the beam class according to the measurement, as illustrated in Table 1 below.

TABLE 1

| Path loss value (X) | Beam class |
|---|---|
| $X > y1$ | 1 |
| $y2 < X \leq y1$ | 2 |
| $y3 < X \leq y2$ | 3 |
| $X \leq y3$ | 4 |

If a measured path loss value X is larger than a predetermined threshold y, the UE 600 may change the beam class to beam class 1. If the path loss value X is larger than a predetermined threshold y2 and equal to or less than the threshold y1, the UE may change the beam class to beam class 2. If the path loss value X is larger than a predetermined threshold y3 and equal to or less than the threshold y2, the UE may change the beam class to beam class 3. If the path loss value X is equal to or less than the threshold y3, the UE may change the beam class to beam class 4.

In this manner, as the path loss value increases, the UE 600 changes the beam class to a beam class having a higher receive beam gain. As the path loss value decreases, the UE changes the beam class to a beam class having a lower receive beam gain. Compared to the foregoing method for adjusting a receive beam gain by turning on/off RF chains, the method for adjusting a receive beam gain by changing a beam class takes a relatively long time.

Upon receipt of a beam class information request message requesting beam class information from an eNB, the UE 600 transmits beam class information to the eNB. The beam class information includes, for example, information about the number of beam classes managed by the UE 600, the number of reception beams included in each beam class, and a receive beam gain difference between the beam classes. The beam class information may be different for each UE.

If the UE 600 is to change beam class, the UE 600 transmits a beam class change request message requesting a beam class change to the eNB and receives a beam class change response message from the eNB in response to the beam class change request message. The beam class change response message includes information indicating whether the eNB accepts or rejects the beam class change request of the UE.

Upon receipt of a beam class change response message accepting the beam class change request from the eNB, the UE 600 changes its beam class.

The operation of a UE for measuring a channel quality value, for example, a path loss value and changing its beam class according to the measurement result has been described by way of example, with reference to FIG. 6. However, the beam class may be changed by the eNB. The eNB may determine the beam class of the UE using beam class information received from the UE and a path loss value and transmit a beam class index indicating the determined beam class to the UE. In this case, upon receipt of the beam class index, the UE changes its beam class to a beam class indicated by the beam class index. Herein, it is assumed that the UE periodically transmits the path loss value or any other value corresponding to the path loss value (for example, a channel quality indicator) to the eNB.

Figure 7:
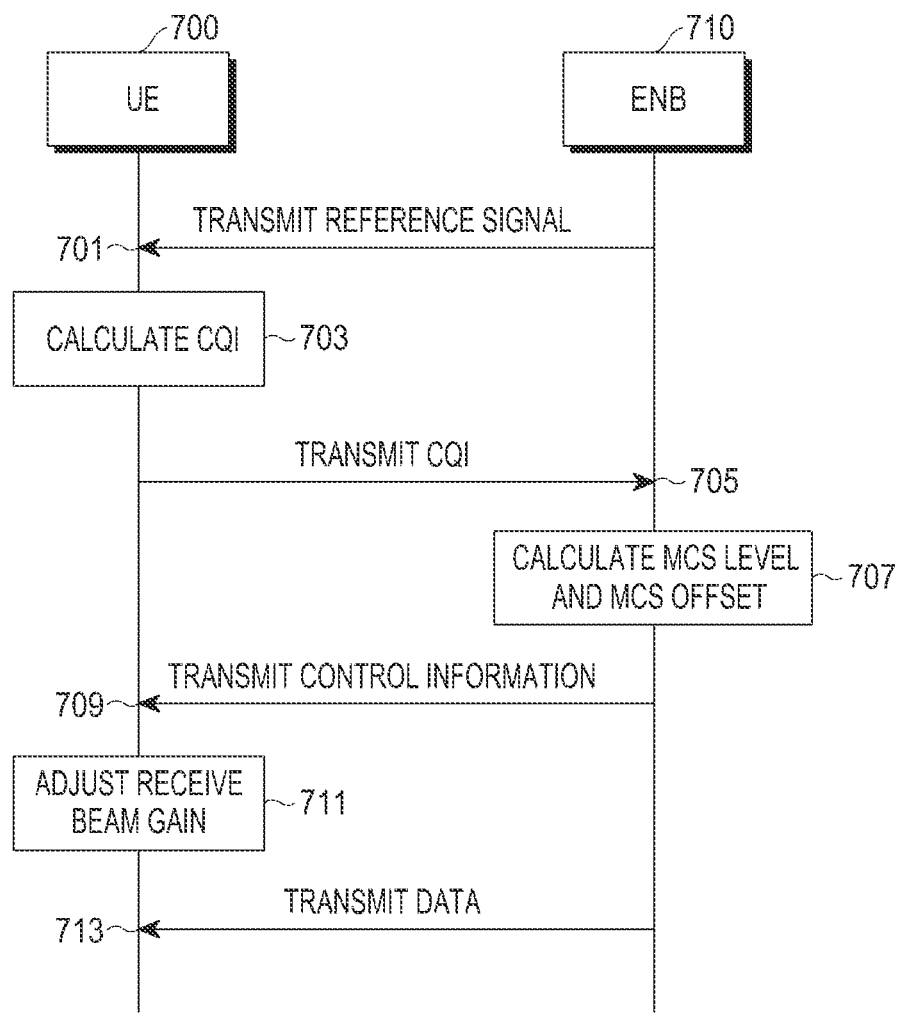
FIG. 7 is a diagram illustrating a signal flow for a procedure for adjusting a receive beam gain in a wireless communication system according to an embodiment of the present disclosure.

FIG. 7 is a diagram illustrating a signal flow for a procedure for adjusting a receive beam gain in a wireless communication system according to an embodiment of the present disclosure.

Referring to FIG. 7, the wireless communication system includes a UE 700 and an eNB 710.

The eNB 710 transmits a reference signal to the UE 700 in operation 701. In operation 703, the UE 700 estimates a channel quality value based on the reference signal and calculates a CQI based on the estimated channel quality value. The UE 700 transmits the calculated CQI to the eNB 710 in operation 705. The UE 700 periodically reports a CQI to the eNB 710.

The eNB 710 determines an MCS level for use in data transmission, based on the received CQI in operation 705 and calculates an MCS offset, taking into account the CQI and a transmission scheme and transmission power to be used for data transmission in operation 707. The eNB 710 calculates the MCS offset by subtracting a data transmission power to be used for data transmission from a reference transmission power used for transmission of the reference signal. The MCS offset is one of a positive value, a negative value, and 0. If the MCS offset is a positive value, this indicates that the eNB 710 decreases the data transmission power to below the reference transmission power. If the MCS offset is a negative value, this indicates that the eNB 710 increases the data transmission power to above the reference transmission power.

The eNB 710 transmits control information including the calculated MCS level and MCS offset to the UE 700 on a PDCCH or an EPDCCH in operation 709.

In operation 711, the UE 700 adjusts a receive beam gain by comparing the received signal quality value calculated based on the reference signal with a threshold being a minimum received signal quality value required for successful reception of data. The threshold may be determined, taking into account the MCS level or both the MCS level and the MCS offset which are acquired from the control information received from the eNB 710, or taking into account the CQI calculated in operation 703.

The process for adjusting a receive beam gain by comparing a received signal quality value with a threshold has been described before with reference to FIGS. 1 to 6 and thus will not be described herein to avoid redundancy.

Subsequently, the eNB 710 transmits data using the MCS level calculated in operation 707 to the UE in operation 713. The data is transmitted on a PDSCH and the UE 700 receives the data from the eNB 710 using the adjusted receive beam gain.

Figure 8:
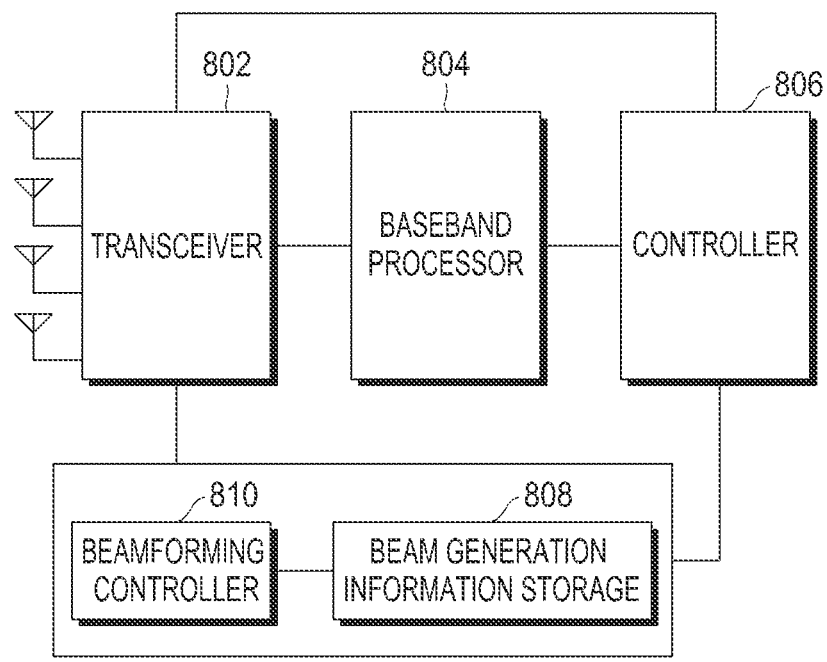
FIG. 8 is a block diagram of a UE for adjusting a receive beam gain in a wireless communication system according to an embodiment of the present disclosure.

FIG. 8 is a block diagram of a UE for adjusting a receive beam gain in a wireless communication system according to an embodiment of the present disclosure.

Referring to FIG. 8, the UE includes a transceiver 802, a baseband processor 804, a controller 806, a beam generation information storage 808, and a beamforming controller 810.

The transceiver 802 transmits and receives various types of messages to and from an eNB. The transceiver 802 forms a reception beam using an RF chain corresponding to each antenna and receives a reference signal and data from the eNB using the reception beams. The transceiver 802 transmits a CQI calculated based on a channel quality value and beam class information.

The baseband processor 804 processes a baseband signal from the reference signal and data received through the transceiver 802.

The controller 806 provides overall control to the UE. Particularly, the controller 806 performs various computation operations such as CQI calculation, path loss calculation, and the like. In addition, the controller 806 determines a beam class to which the UE is supposed to change its beam class and determines whether to adjust a receive beam gain by comparing a signal quality value with a predetermined threshold.

The beam generation information storage 808 stores and manages various parameters required for reception beamforming, for example, information about RF chains turned on according to a receive beam gain and a reception beam direction and phase shift values for the phase shifters of the RF chains.

The beamforming controller 810 controls reception beamforming of the transceiver 802, reads information required for forming a specific reception beam from the beam generation information storage 808, and provides the information to the transceiver 802.

Figure 9:
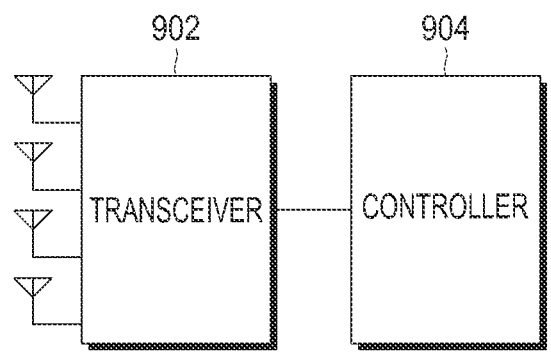
FIG. 9 is a block diagram of an eNB for adjusting a receive beam gain in a wireless communication system according to an embodiment of the present disclosure.

FIG. 9 is a block diagram of an eNB for adjusting a receive beam gain in a wireless communication system according to an embodiment of the present disclosure.

Referring to FIG. 9, the eNB includes a transceiver 902 and a controller 904.

The transceiver 902 transmits and receives various types of messages to and from a UE. The transceiver 902 receives beam class information and a periodic CQI report from the UE.

The controller 904 provides overall control to the eNB. Particularly, the controller 904 performs various computation operations such as MCS level calculation, MCS offset calculation, and the like. In addition, the controller 904 determines a beam class to which the UE is supposed to change its beam class and determines whether to accept a beam class cage request of the UE, upon receipt of a beam class change request message.

Figure 10:
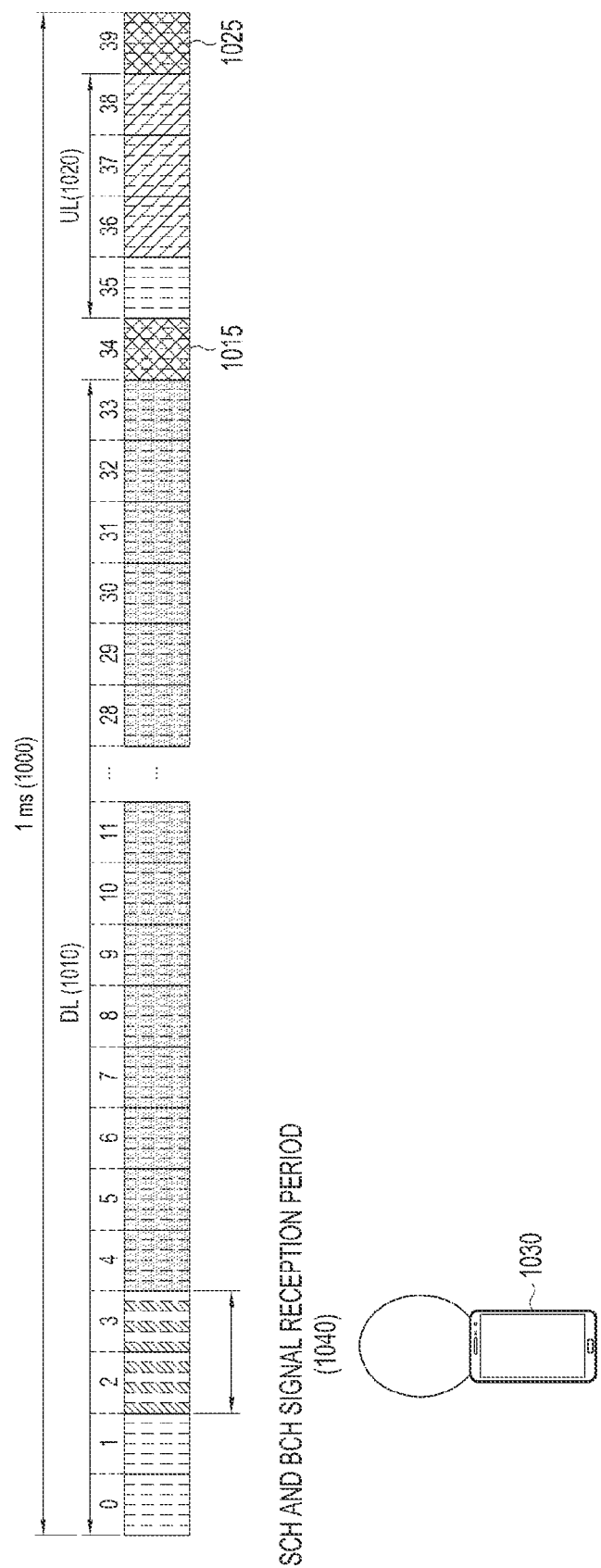
FIG. 10 illustrates an application example of receive beam gain adjustment of a UE in a wireless communication system according to an embodiment of the present disclosure.

FIG. 10 illustrates an application example of receive beam gain adjustment of a UE in a wireless communication system according to an embodiment of the present disclosure.

Referring to FIG. 10, a 1-ms frame 1000 includes a downlink (DL) subframe 1010, an uplink (UL) subframe 1020, and guard period symbols 1015 and 1025. In the example shown in FIG. 10, the DL subframe 1010 includes symbols 0 to 33 and the UL subframe 1020 includes symbols 35 to 38. The UE 1030 has prior knowledge of a threshold for each signal transmitted by an eNB.

The eNB transmits a control channel signal in symbols 0 and 1, a synchronization channel (SCH) signal and a broadcast channel (BCH) signal in symbols 2 and 3, and data in symbols 4 to 33. The eNB receives a control channel signal in symbol 35 and a random access channel (RACH) signal in symbols 36, 37, and 38.

The UE 1030 compares a received signal quality value with a known threshold. If the received signal quality is larger than the threshold, the UE 1030 adjusts a receive beam gain to be used for reception of an SCH signal and a BCH signal from the eNB to be lower than a receive beam gain used for reception of a reference signal. The UE 1030 decreases the receive beam gain by turning off at least one of on-state RF chains during an SCH and BCK signal reception period 1040 and receives SCH and BCH signals with the decreased receive beam gain.

Figure 11:
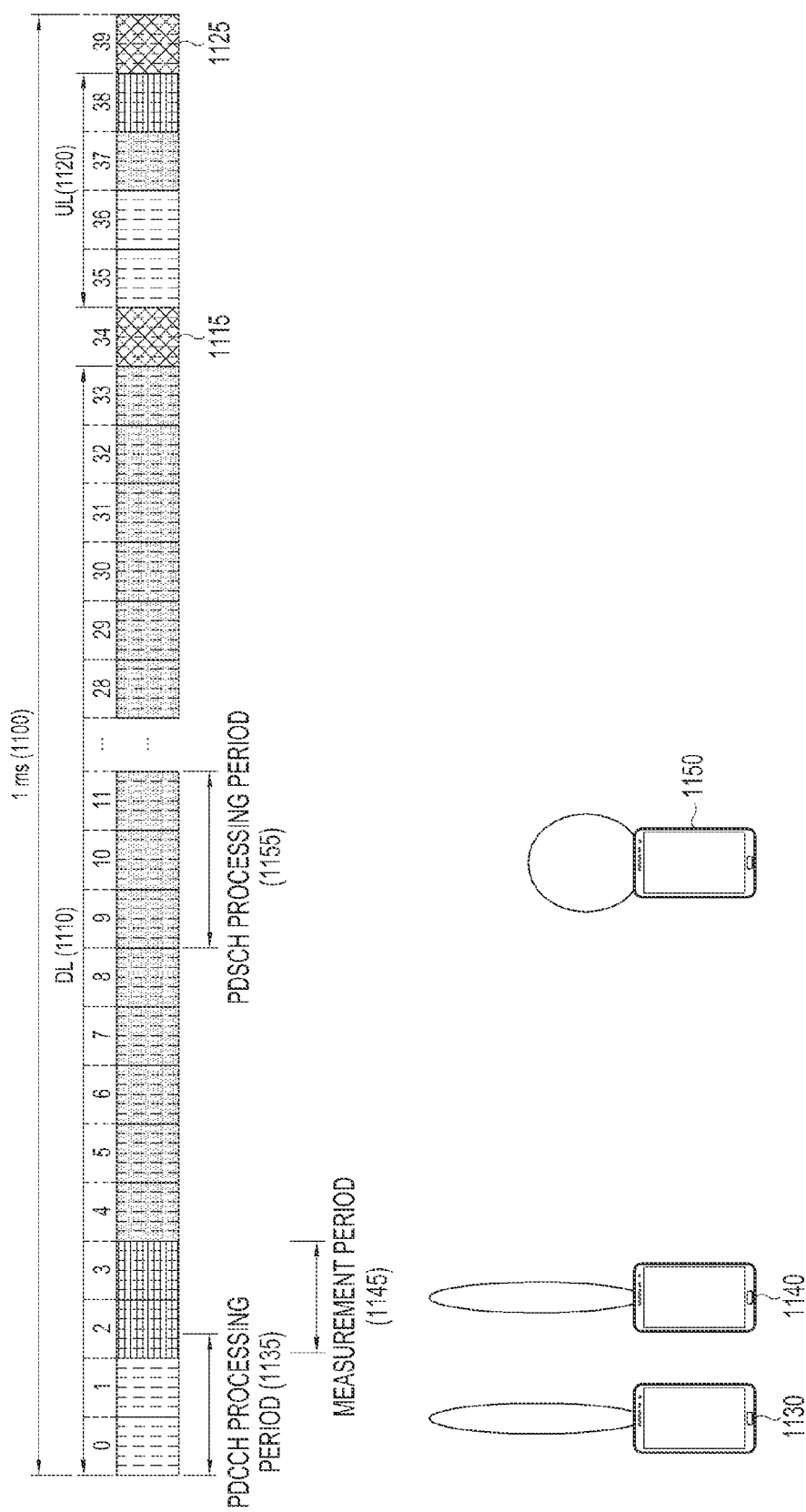
FIG. 11 illustrates another application example of receive beam gain adjustment of a UE in a wireless communication system according to an embodiment of the present disclosure.

FIG. 11 illustrates another application example of receive beam gain adjustment of a UE in a wireless communication system according to an embodiment of the present disclosure.

Referring to FIG. 11, a 1-ms frame 1100 includes a DL subframe 1110, a UL subframe 1120, and guard period symbols 1115 and 1125. It is assumed that the DL subframe 1110 includes symbols 0 to 33 and the UL subframe 1120 includes symbols 35 to 38.

An eNB transmits a control channel signal in symbols 0 and 1, a reference signal in symbols 2 and 3, and data in symbols 4 to 33. The eNB receives a control channel signal in symbols 35 and 36, data in symbol 37, and a reference signal in symbol 38.

A UE 1130 receives a control channel signal from the eNB during a PDCCH processing period 1135 and acquires an MCS level and an MCS offset from the received control channel signal.

A UE 1140 receives a reference signal from the eNB during a measurement period 1145 and measures a CQI based on the received reference signal.

A UE 1150 receives data from the eNB during a PDSCH processing period 1155. The UE 1150 adjusts a receive beam gain to be used for data reception to be lower than a receive beam gain used for reception of a control channel signal and a reference signal. The UE 1150 decreases the receive beam gain by turning off at least one of on-state RF chains and data with the decreased receive beam gain.

Figure 12:
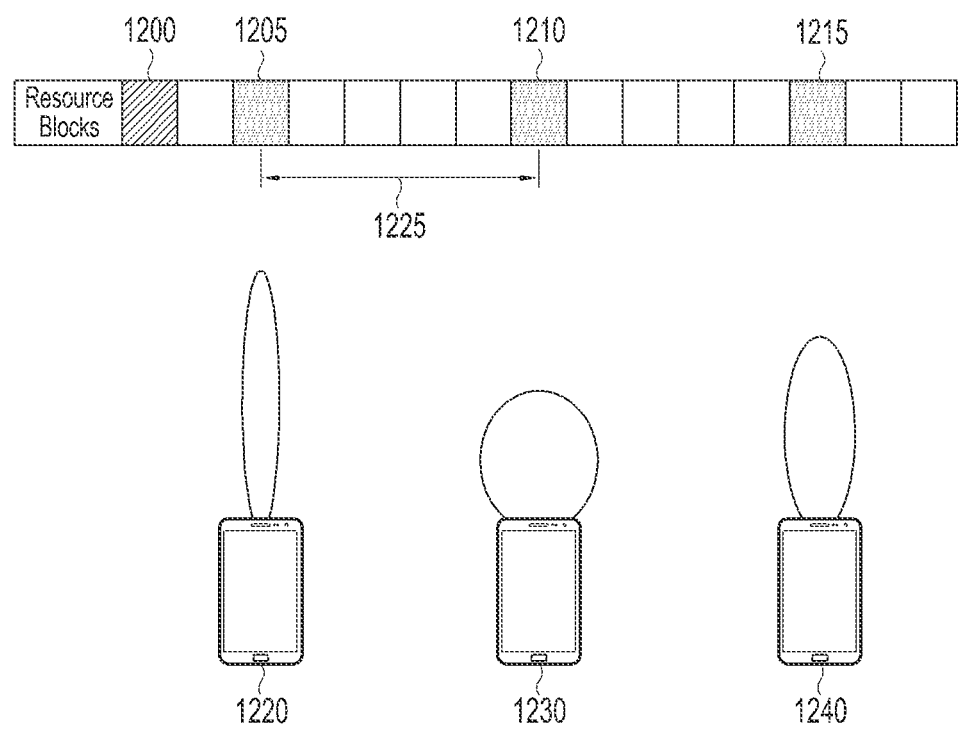
FIG. 12 illustrates another application example of receive beam gain adjustment of a UE in a wireless communication system according to an embodiment of the present disclosure.

FIG. 12 illustrates another application example of receive beam gain adjustment of a UE in a wireless communication system according to an embodiment of the present disclosure.

Referring to FIG. 12, the following description will be given on the assumption of resource blocks (RBs) scheduled by semi-persistent scheduling (SPS) and a voice over IP (VoIP) service using the SPS scheme.

In the VoIP service, resources are allocated at every predetermined interval and a UE transmits data in allocated RBs. An eNB transmits SPS information on a PDCCH in an RB 1200 and the UE checks an RB allocated to the UE based on the SPS information. In the example shown in FIG. 12, RBs 1205, 1210, and 1215 are allocated to the UE. A period 1225 spanning from the RB 1205 to the RB 1210 is a resource allocation period.

Each of UEs 1220, 1230, and 1240 receive data on a PDSCH in each of the RBs 1205, 1210, and 1215 and a receive beam gain used for each UE to receive data is adjusted in various manners, as described before. The UE 1230 adjusts a receive beam gain to be used for data reception in the RB 1210 to be lower than a receive beam gain used for data reception in the RB 1205. The UE 1240 adjusts a receive beam gain to be used for data reception in the RB 1215 to be lower than a receive beam gain used for data reception in the RB 1210.

Figure 13:
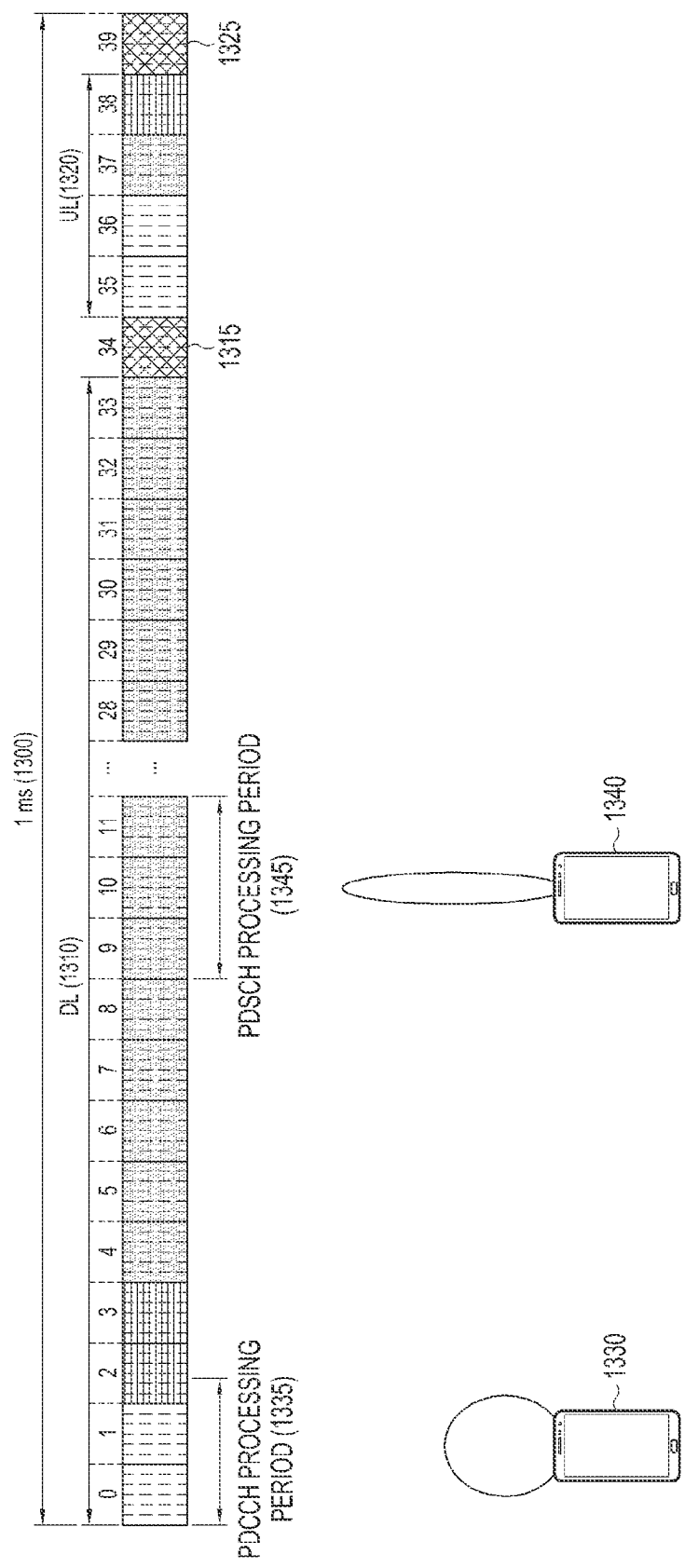
FIG. 13 illustrates another application example of receive beam gain adjustment of a UE in a wireless communication system according to an embodiment of the present disclosure.

FIG. 13 illustrates another application example of receive beam gain adjustment of a UE in a wireless communication system according to an embodiment of the present disclosure.

Referring to FIG. 13, a 1-ms frame 1300 includes a DL subframe 1310, a UL subframe 1320, and guard period symbols 1315 and 1325. In the example shown in FIG. 13, the DL subframe 1310 includes symbols 0 to 33 and the UL subframe 1320 includes symbols 35 to 38.

An eNB transmits a control channel signal in symbols 0 and 1, a reference signal in symbols 2 and 3, and data in symbols 4 to 33. The eNB receives a control channel signal in symbols 35 and 36, data in symbol 37, and a reference signal in symbol 38.

A UE 1330 receives a control channel signal from the eNB during a PDCCH processing period 1335 and acquires an MCS level and an MCS offset from the received control channel signal.

A UE 1340 receives data from the eNB during a PDSCH processing period 1345. The UE 1340 adjusts a receive beam gain to be used for data reception to be higher than a receive beam gain used for reception of a control channel signal. The UE 1340 increases the receive beam gain by turning on at least one of off-state RF chains and data with the increased receive beam gain.

As is apparent from the foregoing description, the present disclosure can minimize power consumption of a UE by adjusting a receive beam gain according to a channel situation in a wireless communication system.

The method and apparatus for adjusting a receive beam gain according to an embodiment of the present disclosure may be implemented in hardware, software, or a combination of hardware and software. The software may be stored, for example, irrespective of erasable or rewritable, in a volatile or non-volatile storage device such as a storage device like read-only memory (ROM), a memory such as random access memory (RAM), a memory chip, or an integrated circuit (IC), or an optically or magnetically writable and machine-readable (for example, computer-readable) storage medium such as compact disc (CD), DVD, or magnetic tape. The method for adjusting a receive beam gain according to the present disclosure may be implemented in a computer or portable terminal including a controller and a memory. The memory is an example of a machine-readable storage medium suitable for storing a program or programs including instructions that implement embodiments of the present disclosure.

Accordingly, the present disclosure includes a program including code for implementing the apparatuses or methods as disclosed in the claims and a machine (or computer)-readable storage medium that stores the program. Also, this program may be electronically transferred through a medium such as a communication signal transmitted by wired or wireless connection and the present disclosure includes its equivalents appropriately.

According to an embodiment of the present disclosure, the apparatus for adjusting a receive beam gain may receive the program from a wired or wireless connected program providing device and store the program. The program providing device may include a program having instructions for implementing a predetermined content protection method by a graphic processing device, a communication unit for conducting wired or wireless communication with the graphic processing device, and a controller for transmitting the program to the transmission and reception device upon request of the graphic processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for adjusting a receive beam gain by a user equipment (UE) in a wireless communication system, the method comprising:
   estimating a signal quality value based on a reference signal received from a base station (BS);
   transmitting information related to the estimated signal quality value to the BS;
   comparing the signal quality value with a signal quality threshold required for data reception; and
   adjusting a first receive beam gain used for the data reception in comparison to a second receive beam gain used for a reception of the reference signal by adjusting a number of radio frequency (RF) chains in a turned on state among chains for antennas included in the UE based on a result of the comparison.

2. The method of claim 1, wherein the adjusting of the first receive beam gain comprises:
   if the signal quality value is less than the signal quality threshold, turning on at least one RF chain to increase the first receive beam gain used for the data reception to above the second receive beam gain used for the reception of the reference signal.

3. The method of claim 1, wherein the adjusting of the first receive beam gain comprises:
   if the signal quality value is larger than the signal quality threshold, turning off at least one RF chain to decrease the first receive beam gain used for the data reception to below the second receive beam gain used for the reception of the reference signal.

4. The method of claim 2,
   wherein each of the RF chains for the antennas comprises:
      an antenna,
      a low noise amplifier (LNA), and
      a phase shifter, and
   wherein the method further comprises:
      adjusting a phase shift value of a phase shifter included in the RF chain in the turned on state to make a reception beam direction after the adjusting of the first receive beam gain identical to a reception beam direction before the adjusting of the first receive beam gain.

5. The method of claim 1, further comprising:
   comparing the signal quality value with a predetermined threshold;
   if the signal quality value is greater than the predetermined threshold, changing a predetermined beam class to a beam class having a relatively high receive beam gain;
   if the signal quality value is less than the predetermined threshold, changing the predetermined beam class to a beam class having a relatively low receive beam gain; and
   adjusting the first receive beam gain used for the data reception to a receive beam gain related to the changed beam class.

6. The method of claim 1, further comprising:
   transmitting beam class information to the BS, the beam class information including information related to at least one of beam classes managed by the UE, a number of reception beams included in each beam class, or a difference between receive beam gains of the beam classes.

7. The method of claim 1, further comprising:
   acquiring a modulation and coding scheme (MCS) level applied to data and an MCS offset being a difference between a reference signal transmission power and a data transmission power from control information received from the BS; and
   determining the signal quality threshold based on the MCS level, a channel quality indicator (CQI), or the MCS level and the MCS offset.

8. The method of claim 1, wherein the signal quality value comprises at least one of:
   a path loss value,
   a signal-to-noise ratio (SNR),
   a signal-to-interference ratio (SIR),
   a signal-to-interference plus noise ratio (SINR),
   a signal-to-leakage plus noise ratio (SLNR),
   a reference signal strength indicator (RSSI),
   a reference signal received quality (RSRQ), or
   a reference signal received power (RSRP).

9. A user equipment (UE) for adjusting a receive beam gain in a wireless communication system, the UE comprising:
   at least one processor configured to:
      estimate a signal quality value based on a reference signal received from a base station (BS),
      compare the signal quality value with a signal quality threshold required for data reception, and
      adjust a first receive beam gain used for the data reception in comparison to a second receive beam gain used for a reception of the reference signal by adjusting a number of radio frequency (RF) chains in a turned on state among chains for antennas included in the UE based on a result of the comparison; and
   a transceiver configured to transmit information related to the estimated signal quality value to the BS.

10. The UE of claim 9, wherein, if the signal quality value is less than the signal quality threshold, the at least one processor is further configured to turn on at least one RF chain to increase the first receive beam gain used for the data reception to above the second receive beam gain used for the reception of the reference signal.

11. The UE of claim 9, wherein, if the signal quality value is larger than the signal quality threshold, the at least one processor is further configured to turn off at least one RF chain to decrease the first receive beam gain used for the data reception to below the second receive beam gain used for the reception of the reference signal.

12. The UE of claim 10,
wherein each of the RF chains for the antennas comprises:
an antenna,
a low noise amplifier (LNA), and
a phase shifter, and
wherein the at least one processor is further configured to:
adjust a phase shift value of a phase shifter included in the RF chain in the turned on state to make a reception beam direction after the adjusting of the first receive beam gain identical to a reception beam direction before the adjusting of the first receive beam gain.

13. The UE of claim 9, wherein the at least one processor is further configured to:
compare the signal quality value with a predetermined threshold,
if the signal quality value is larger than the predetermined threshold, change a predetermined beam class to a beam class having a relatively high receive beam gain,
if the signal quality value is less than the predetermined threshold, change the predetermined beam class to a beam class having a relatively low receive beam gain, and
adjust the first receive beam gain used for the data reception to a receive beam gain related to the changed beam class.

14. The UE of claim 9, wherein the transceiver is further configured to transmit beam class information to the BS, the beam class information including information related to at least one of beam classes managed by the UE, a number of reception beams included in each beam class, or a difference between receive beam gains of the beam classes.

15. The UE of claim 9, wherein the at least one processor is further configured to:
acquire a modulation and coding scheme (MCS) level applied to data and an MCS offset being a difference between a reference signal transmission power and a data transmission power from control information received from the BS, and
determine the minimum signal quality value, taking into account the MCS level, a channel quality indictor (CQI), or the MCS level and the MCS offset.

16. The UE of claim 9, wherein the signal quality value comprises at least one of:
a path loss value,
a signal-to-noise ratio (SNR),
a signal-to-interference ratio (SIR),
a signal-to-interference plus noise ratio (SINR),
a signal-to-leakage plus noise ratio (SLNR),
a reference signal strength indicator (RSSI),
a reference signal received quality (RSRQ), or
a reference signal received power (RSRP).

* * * * *